(12) United States Patent
Lu et al.

(10) Patent No.: US 10,641,513 B2
(45) Date of Patent: May 5, 2020

(54) NETWORK MANAGEMENT SYSTEM AND METHOD FOR AUTOMATIC REGISTRATION OF NETWORK DEVICE THEREOF

(71) Applicant: DELTA ELECTRONICS, INC., Taoyuan (TW)

(72) Inventors: Yung-Cheng Lu, Taoyuan (TW); Te-Ju Pan, Taoyuan (TW); Hua-Yi Hsieh, Taoyuan (TW); Yuan-Ping Hsieh, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 64 days.

(21) Appl. No.: 15/971,852

(22) Filed: May 4, 2018

(65) Prior Publication Data
US 2018/0324226 A1 Nov. 8, 2018

Related U.S. Application Data

(60) Provisional application No. 62/501,226, filed on May 4, 2017.

(51) Int. Cl.
*F24F 11/52* (2018.01)
*G05B 13/02* (2006.01)
(Continued)

(52) U.S. Cl.
CPC .............. *F24F 11/52* (2018.01); *F24F 11/63* (2018.01); *G05B 13/024* (2013.01); *G05B 15/02* (2013.01);
(Continued)

(58) Field of Classification Search
None
See application file for complete search history.

(56) References Cited

U.S. PATENT DOCUMENTS

| 9,294,476 B1 * | 3/2016 | Lurey ................. H04L 63/0861 |
| 2002/0085579 A1 * | 7/2002 | Sullivan ................ H04L 67/306 370/428 |

(Continued)

FOREIGN PATENT DOCUMENTS

| JP | 2014230144 A | 12/2014 |
| JP | 2015061100 A | 3/2015 |

(Continued)

*Primary Examiner* — Scott B Christensen
(74) *Attorney, Agent, or Firm* — Muncy, Geissler, Olds & Lowe, P.C.

(57) ABSTRACT

A network management system and method for automatic registration of network device thereof are disclosed. The system has an electronic device, a network device and a control host. The electronic device generates and sends configuration data to the network device according to a user operation. The network device automatically generates registration data having device identity data and location identity data, connects to a communication network according to the configuration data, and sends the registration data to the control host via the communication network. The control host determines classification information according to the registration data and configures the device identity data to correspond to the classification information and location identity data for completing registration of the network device. The present disclosed example can effectively omit a registration operation inputted by the user manually via configuring the network device to register at the control host automatically.

18 Claims, 11 Drawing Sheets

(51) Int. Cl.
　　　*F24F 11/63*　　(2018.01)
　　　*G05B 15/02*　　(2006.01)
　　　*H05B 47/19*　　(2020.01)
　　　*H05B 47/105*　　(2020.01)
　　　*H04L 29/06*　　(2006.01)
　　　*F24F 120/20*　　(2018.01)
　　　*H04W 76/10*　　(2018.01)
　　　*G06F 3/0484*　　(2013.01)

(52) U.S. Cl.
　　　CPC ....... *H04L 65/1073* (2013.01); *H05B 47/105* (2020.01); *H05B 47/19* (2020.01); *F24F 2120/20* (2018.01); *G05B 2219/2642* (2013.01); *G06F 3/0484* (2013.01); *H04W 76/10* (2018.02)

(56) References Cited

U.S. PATENT DOCUMENTS

| | | |
|---|---|---|
| 2005/0277412 A1 | 12/2005 | Anderson et al. |
| 2013/0151608 A1 | 6/2013 | Wiseman et al. |
| 2014/0244768 A1* | 8/2014 | Shuman .................. H04W 4/70 709/206 |
| 2014/0244834 A1* | 8/2014 | Guedalia ................. H04L 67/16 709/224 |
| 2014/0310398 A1 | 10/2014 | Zhou et al. |
| 2015/0237071 A1* | 8/2015 | Maher ..................... H04L 63/20 726/1 |
| 2015/0323206 A1* | 11/2015 | Chan ..................... H04L 67/125 700/29 |
| 2016/0056970 A1 | 2/2016 | Yabe et al. |
| 2019/0044826 A1* | 2/2019 | Flores Guerra ......... H04L 41/22 |

FOREIGN PATENT DOCUMENTS

| | | |
|---|---|---|
| JP | 2015510289 A | 4/2015 |
| JP | 2016001425 A | 1/2016 |
| JP | 2016045562 A | 4/2016 |
| TW | 201628433 A | 8/2016 |

* cited by examiner

NETWORK MANAGEMENT SYSTEM AND METHOD FOR AUTOMATIC REGISTRATION OF NETWORK DEVICE THEREOF

BACKGROUND OF THE INVENTION

Field of the Invention

The technical field relates to system and method, and more particularly related to network management system and method for automatic registration of network device thereof.

Description of Related Art

A network management system (such as integrated lighting system or central air conditioning system) based on IoT (Internet of Things) of the related art is configured to manage all of the network devices (such as sensor, fan or lighting device with an ability of networking) by a control host.

Please refer to FIG. 1, which is a sequence diagram of a registration network device of the related art. As shown in FIG. 1, if the user (such as an administrator) would like to add an unregistered network device 14 to a network management system, the user must first make the electronic device 12 (such as a laptop) be connected to the network device 14 (step S100), and input a configuration operation by the electronic device 12 (step S102) to configure the network device 14 (step S104). Moreover, the network device 14 may return a notification to the electronic device 12 after completion of configuration (step S106).

After completion of configuration of network device 14, the user must operate the electronic device 12 to make the electronic device 12 connect to the control host 10 via a network (step S108) and input a registration operation by the electronic device 12 after completion of establishing the connection (step S110) for controlling the control host 10 to register the new network device 14 (step S112).

Finally, the control host 10 may establish a connection with the registered network device 14 and manage or monitor the network device 14 (step S114).

In the registration network device of the related art, the user must do both configuring the network device 14 and registering the network device 14 in the control host 10 manually if the user would like to add an unregistered networked device 14, such that the adding of an unregistered networked device 14 is time-consuming and laborious.

Accordingly, there is currently a need for a method for automatic registration of network device having the ability of reducing the time of adding an unregistered networking device efficiently and saving an operation of adding an unregistered networking device.

SUMMARY OF THE INVENTION

The present disclosed example is directed to a network management system and a method for automatic registration of network device thereof having the ability of making the network device execute a registration to a control host automatically.

One of the exemplary embodiments, a network management system, comprises a computer program, a network device and a control host. The computer program is installed in an electronic device and configured to control the electronic device to generate configuration data and transmitting the configuration data, wherein the configuration data comprises network identify data and user identify data. The network device is configured to generate registration data according to the configuration data, connect to a communication network according to the network identity data, and transmit the registration data via the communication network, wherein the registration data comprises the user identity data, device identity data of the network device and location identity data of the network device. The control host is connected to the communication network, and the control host determines classification information according to the user identity data of the registration data after receipt of the registration data, executes a registering process on the device identity data of the registration data for configuring the device identity data to correspond to the classification information and the location identity data of the registration data, and records a corresponding relationship between the device identity data, the classification information and the location identity data.

One of the exemplary embodiments, a method for automatic registration of network device applied to a network management system, the network management system comprising a network device, a control host and a computer program used to be installed in an electronic device, the method comprising following steps of: a) controlling the electronic device to generate configuration data and transmitting the configuration data to the network device via the computer program, wherein the configuration data comprises network identify data and user identify data; b) generating registration data according to the configuration data at the network device, wherein the registration data comprises the user identify data, device identity data of the network device, and location identity data of the network device; c) connecting to a communication network according to the network identity data, and transmitting the registration data to the control host via the communication network; d) determining classification information according to the user identity data of the registration data at the control host; and, e) executing a registering process on the device identity data of the registration data for configuring the device identity data to correspond to the classification information and the location identity data of the registration data, and recording a corresponding relationship between the device identity data, the classification information and the location identity data at the control host.

The present disclosed example can effectively save a manual registration operation inputted by the user via configuring the network device to register at the control host automatically.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims are all covered by the claims claimed by the present disclosed example.

The present disclosed example discloses a network management system, the network management system is mainly used to execute a method for automatic registration of network device (referred to as registration method in the following description) for making a network device execute a registration to a control host automatically after completion of registration. The present disclosed example can save the manual registration operation from the user.

Figure 1:
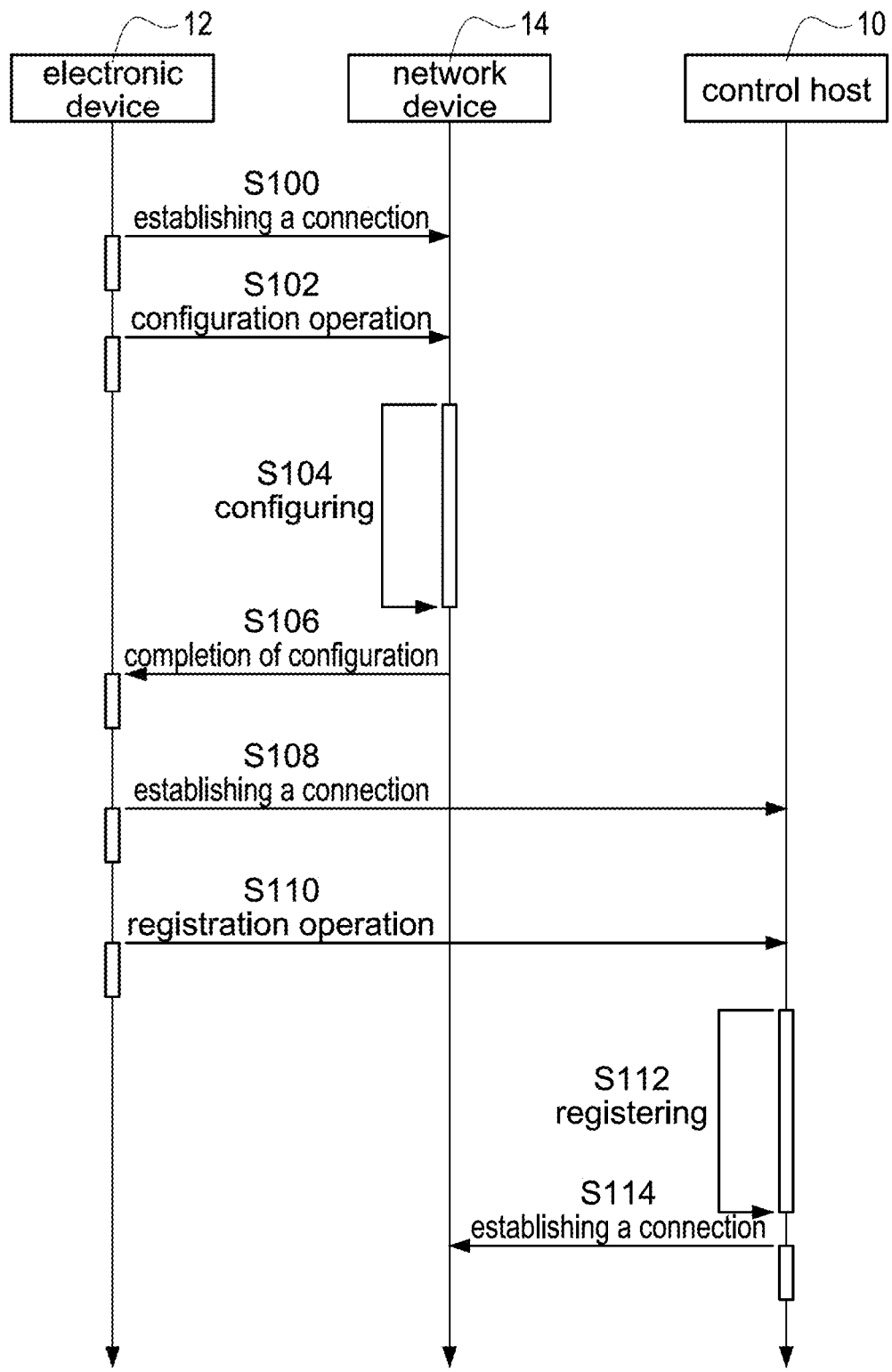
FIG. 1 is a sequence diagram of a registration network device of the related art.
Figure 2:
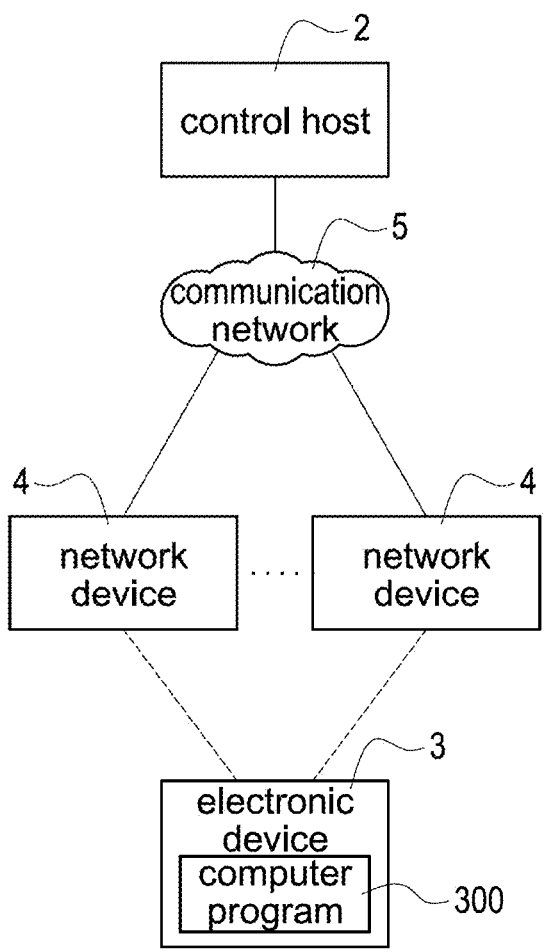
FIG. 2 is an architecture diagram of a network management system according to one embodiment of the present disclosed example.
Figure 3:
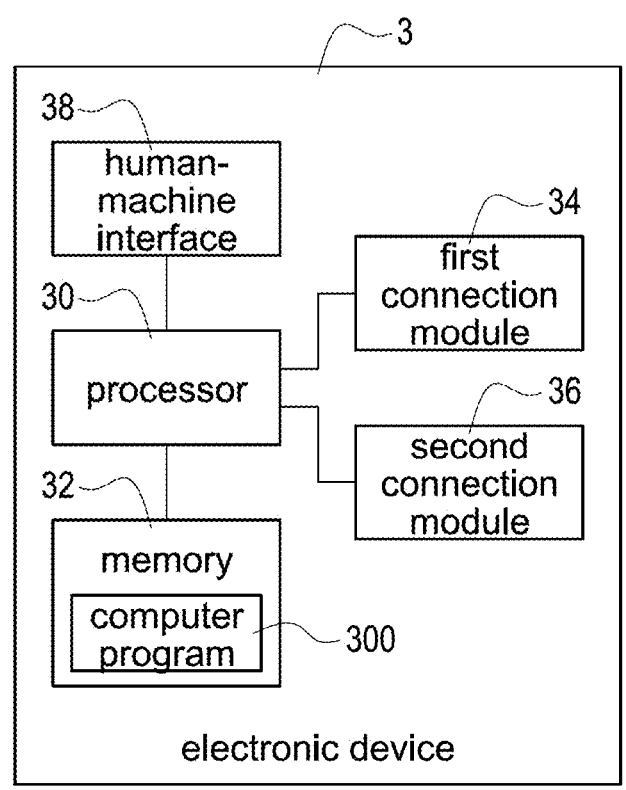
FIG. 3 is an architecture diagram of an electronic device according to one embodiment of the present disclosed example.
Figure 4:
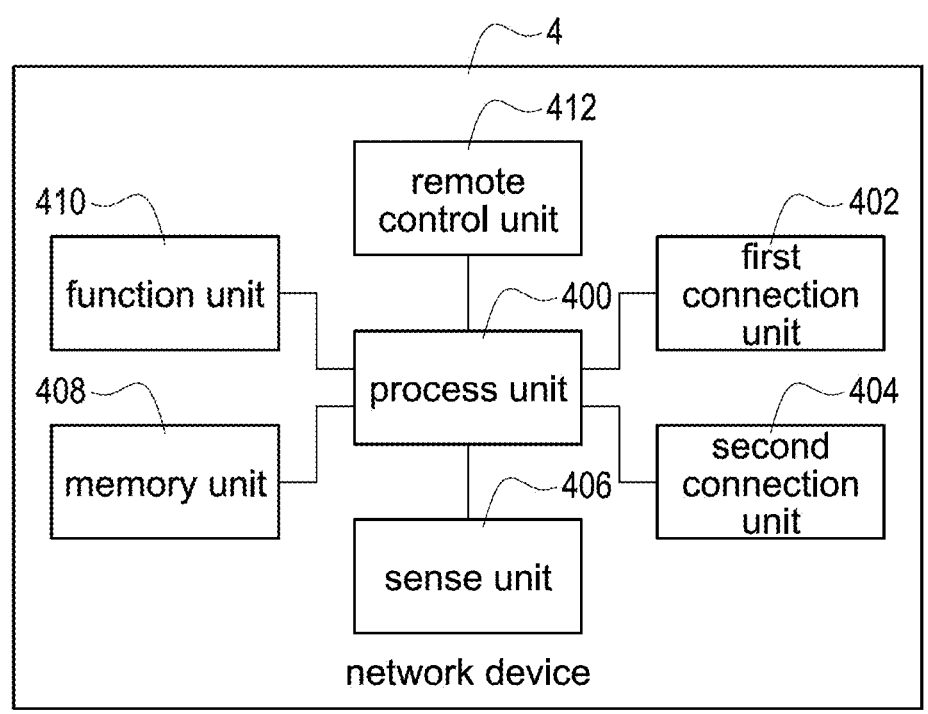
FIG. 4 is an architecture diagram of a network device according to one embodiment of the present disclosed example.

Please refer to FIG. 2 to FIG. 4 simultaneously, FIG. 2 is an architecture diagram of a network management system according to one embodiment of the present disclosed example, FIG. 3 is an architecture diagram of an electronic device according to one embodiment of the present disclosed example, and FIG. 4 is an architecture diagram of a network device according to one embodiment of the present disclosed example.

The network management system (such as a cloud computing system, an integrated lighting control system, a sensing network system or the other network system comprising a plurality of network devices) of the present disclosed example mainly comprises a control host 2, one or more network device(s) 4 and a computer program 300.

The computer program 300, such as an application program or a driver of the network device, is used to be installed in a memory 32 of an electronic device 3, such as smartphone, wearable device, tablet, laptop or personal computer. The computer program 300 may interact with the other devices of the network management system after the computer program 300 is executed by a processor 30 of the electronic device 3 for assisting a user holding the electronic device 3 to configure the unregistered network device 4.

More specifically, as shown in FIG. 3, the electronic device 3 may comprise the memory 32 configured to store data, a first connection module 34 configured to connect a communication network 5, a second connection module 36 configured to connect the network device 4, a human-machine interface 38 (such as touch screen, speaker, buttons, indicator lights or the other input/output components) configured to input/output information, and the processor 30 electrically connected to above devices and configured to control the electronic device 3.

One of the exemplary embodiments, the memory 32 is a non-transient computer-readable recording media, a plurality of computer-readable codes is recorded in the computer program 300. After the computer-readable codes are executed by the processor 30, the electronic device 3 may interact with the network device 4 or the control host 2 for implementing the registration method of the present disclosed example.

Please refer to FIG. 2, each of the network devices 4, such as a smart sensor having the ability of connecting to a network, a smart fan, a smart lighting device or the other IoT devices, is a node of the network management system. After configuration and registration, each of the network devices 4 may connect to the remote control host 2 via the communication network 5 (such as the Internet or Local Area Network), be monitored and controlled by the control host 2, or execute data transmission with the control host 2 (such as uploading sensing data, receiving a wind-speed control instruction or a receiving a lighting control instructions).

More specifically, as shown in FIG. 4, the network device 4 may comprise a first connection unit 402, a second connection unit 404, a memory unit 408 and a process unit 400 electrically connected to above units. The first connection unit 402 is configured to connect the communication network 5. The second connection unit 404 is configured to connect the electronic device 3. The memory unit 408 is configured to store data. The process unit 400 is configured to control the network device 4.

One of the exemplary embodiments, both the second connection module 36 of the electronic device 3 and the second connection unit 404 of the network device 4 are wired connection modules, such as USB connector/connection port, RJ45 connector/connection port or the other connection module, and connect to each other by a cable.

One of the exemplary embodiments, both the second connection module 36 of the electronic device 3 and the second connection unit 404 of the network device 4 are wireless connection modules, such as Wi-Fi transmitter, Bluetooth transmitter, Zig-Bee transmitter, sonic transmitter, infrared transmitter, or the other wireless transmitters.

One of the exemplary embodiments, the communication network 5 may be Wi-Fi network, Ethernet network, the internet or the other communication network with a characteristic of high-speed transmission. Both the first connection module 34 of the electronic device 3 and the first connection unit 402 of the network device 4 are the connection modules compatible with above communication standard.

Furthermore, the second connection unit 404 of the network device 4 may establish a heterogeneous network which its type is different from above-mentioned communication network 5, and connect to the second connection module 36 of the electronic device 3 via the heterogeneous network. Above-mentioned heterogeneous network may be Wi-Fi direct network, Bluetooth network, Zig-bee network or the other wireless personal area network (WPAN) with a characteristic of small transmission range. Both the second connection module 36 of the electronic device 3 and the second connection unit 404 of the network device 4 are the connection modules compatible with above communication standard.

One of the exemplary embodiments, the maximum transmission speed of the communication network 5 is higher than the maximum transmission speed of the heterogeneous network. Furthermore, a communication standard of the communication network 5 is incompatible with a communication standard of the heterogeneous network. In other words, a network type of the communication network 5 is different from a network type of the heterogeneous network, such that the communication network 5 and the heterogeneous network do not have the ability of connecting to each other.

Please be noted that each of the electronic device 3 and the network device 4 must be arranged two different types of the network modules (the first connection module 34 and the first connection unit 402 belong one type, the second connection module 36 and the second connection unit 404 belong another type) simultaneously for connecting to the communication network 5 and the heterogeneous network simultaneously because the network type of the communication network 5 is different from the network type of the heterogeneous network, but this specific example is not intended to limit the scope of the present disclosed example.

One of the exemplary embodiments, only one type of the network modules is necessary to be arranged on each of the electronic device 3 and the network device 4 (such as the first connection module 34 and the first connection unit 402) if the network type of the communication network 5 is the same as the network type of the heterogeneous network (such as both of the communication network 5 and the heterogeneous network are Wi-Fi network).

One of the exemplary embodiments, the network device 4 may further comprise a sense unit 406 electrically connected to the process unit 400. The sense unit 406 may be an environmental sensor, such as thermometer, hygrometer, illuminometer, enthalpy meter, or other environmental sensors, and have the ability of sensing the current environmental status (such as temperature, humidity, brightness, enthalpy, or the other sensing signals) of the environment which the sensor unit 406 is arranged. Moreover, the process unit 400 may transform the sensed environmental status into digital sense data, and upload the sense data to the control host 2 via the first connection unit 402.

One of the exemplary embodiments, the sense unit 406 may be a human detector, such as camera, PIR sensor, ultrasonic sensor, thermal camera, or the other human detectors, having the ability of detecting whether any human enters or leaves the environment which the sense unit 406 is arranged, and trigger or stop triggering a corresponding trigger signal if detecting that the human enters or leaves the environment. Moreover, the process unit 400 may notify the control host 2 via the first connection unit 402 if receipt of the trigger signal. Thus, the network device 4 has the ability of automatically stopping sensing if there is no human in the environment, so as to save the consumption of electricity.

One of the exemplary embodiments, the network device 4 is configured to adjust the environmental status (such as temperature or brightness). More specifically, the network device 4 may further comprise a function unit 410 (such as fan or lamp) electrically connected to the process unit 400. The process unit 400 may receive one or more control parameter(s) from outside via the first connection unit 402, and control the operation status (such as rotating speed of fan or intensity of lighting) of the function unit 410 according to the received control parameter(s) for adjusting the environmental status (such as temperature or brightness) which the function unit 410 is located.

One of the exemplary embodiments, the network device 4 further comprises a remote control unit 412 electrically connected to the process unit 400. The remote control unit 412 was paired with an external remote controller (not shown in figures) in advance, and has the ability of receiving the said control parameter(s) from the remote controller.

Figure 5:
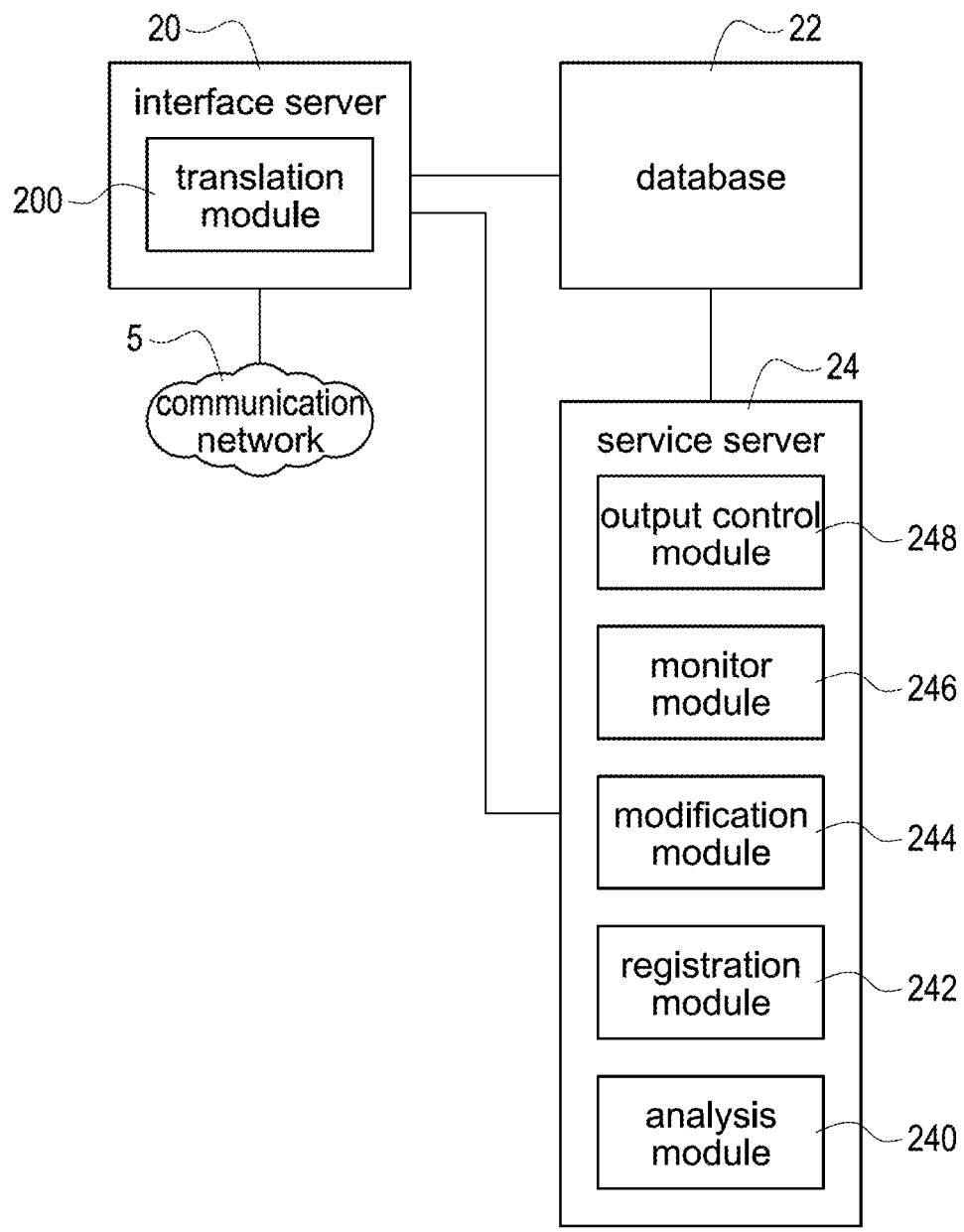
FIG. 5 is an architecture diagram of a control host according to one embodiment of the present disclosed example.

Please refer to FIG. 5 simultaneously, FIG. 5 is an architecture diagram of a control host according to one embodiment of the present disclosed example. In this embodiment, the control host 2 may comprise an interface server 20, a database 22 and a service server 24. All the interface server 20, the database 22 and the service server 24 are independent servers, and are connected to each other via a network (such as an internal network or a communication network 5) or cables (such as the Ethernet cables, the fiber cables, the serial transmission cables, the USB transmission cables, or the other cables with capacity of data transmission or signal transmission). Moreover, the interface server 20, the database 22 and the service server 24 may be arranged in the same or different location(s), but this specific example is not intended to limit the scope of the present disclosed example.

The service server 24 is configured to assist the user (such as administrator) in management of the network devices 4 of the network management system. More specifically, after the electronic device 3 is connected to the service server 24 according to the user's operation, the service server 24 may return monitor dashboard data to the electronic device 3 for making the electronic device 3 render and display a graphical user interface (GUI) according to the monitor dashboard data. Then, the user may operate the service server 24 via the rendered GUI for retrieving the operation status and the current configuration of the network devices 4. Furthermore, the user may modify the configuration of the network devices 4 via the rendered GUI.

One of the exemplary embodiments, the service server 24 may comprise an analysis module 240, a registration module 242, a modification module 244, a monitor module 246 and an output control module 248. The analysis module 240 is configured to execute classification to each of the network devices 4, and determine classification information corresponding to each of the network devices 4. The registration module 242 is configured to execute registration for the unregistered network device 4 according to the classification information corresponding to the unregistered network device 4. The modification module 244 is configured to modify the registration data of the registered network device 4. The monitor module 246 is configured to monitor and control the registered network device 4. The output control module 248 is configured to generate output data (such as the monitor screen shown in FIG. 11) according to the user's requirements, and return the output data to the electronic device 3.

Please be noted that the module 240-248 are arranged in the service server 24 in this embodiment, but this specific example is not intended to limit the scope of the present disclosed example. One of the exemplary embodiments, the module 240-248 may be arranged in the interface server 20 or database 22.

The database 22 is configured to store the registration data of each of the network devices 4. One of the exemplary embodiments, the database 22 may be directly arranged in a memory (not shown in figures) of the interface server 20 or the service server 24. In other words, the interface server 20 or the service server 24 may have the ability of implementing function of database.

The interface server 20 is configured to implement a function of library translation. More specifically, each of the function instructions (such as method structure of program language) of library is usually configured to implement the low-level or simple functions (such as loading simple data, writing simple data, outputting simple data or render simple graphic). If a developer would like to develop a program for implementing the high-level or complex function, a large amount of above function instructions must be called in the program, so that the complexity and difficulty in development of the program increase significantly.

For solving above-mentioned technical program, the interface server 20 is configured to an Application Programming Interface server in this embodiment, and has the ability of translating and executing the received instructions. More specifically, the developer may configure one or more API instruction(s) in advance, each of the instructions is configured to implement the different high-level or complex functions. Thus, the developer determines a plurality of function instructions for implementing each of the high-level or complex functions, configures the determined function instructions to correspond to each of the API instructions, and records a corresponding relationship between above API instruction and the function instructions.

Thus, the developer may directly use the simple API instructions for implementing the high-level or complex functions without use of a large amount of above-mentioned complex function instructions, so as to reduce the complexity of the program and the difficulty of development significantly.

For making the interface server 20 have the ability of understanding above-mentioned API instructions correctly, the interface server 20 comprises a translation module 200 in this embodiment. The translation module 200 is configured to control the interface server 20 to translate the received API instruction according to the corresponding relationship between above-mentioned API instructions and the function instructions after receipt of each of the API instructions, so as to obtain a plurality of function instructions corresponding to the received API instruction. Then, the interface server 20 or the service server 24 may execute the function instructions obtained by translation for implementing the corresponding function.

Please be noted that above-mentioned translation module 200, analysis module 240, registration module 242, modification module 244, monitor module 246 and output control module 248 may be software module or hardware circuit module, but this specific example is not intended to limit the scope of the present disclosed example. If above-mentioned module 200, 240-248 are software module, a memory (not shown in figure) of each of the server 20-24 comprises a non-transient storage media recorded a plurality of corresponding computer-executable codes. And each of the module 20, 240-248 may be implemented if a processor (not shown in figures) of each of the server 20-24 executes above-mentioned corresponding computer-executable codes.

Figure 6:
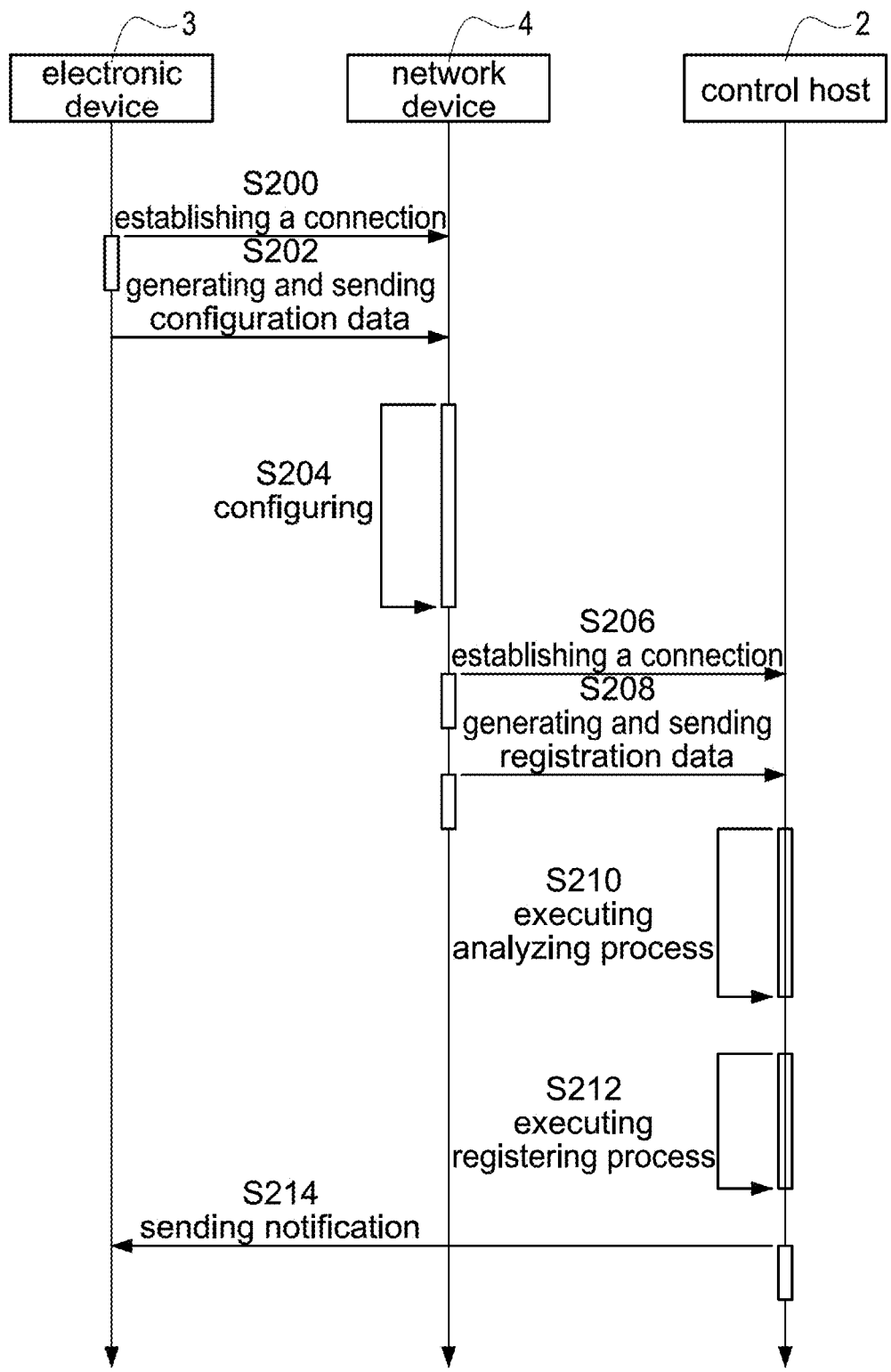
FIG. 6 is a sequence diagram of a method for automatic registration of network device according to a first embodiment of the present disclosed example.

Please refer to FIG. 6 simultaneously, which is a sequence diagram of a method for automatic registration of network device according to a first embodiment of the present disclosed example. The registration method of each embodiment of the present disclosed example is implemented by the network management system shown in FIG. 1 to FIG. 5.

The registration method of this embodiment comprises following steps.

Step S200: the processor 30 of the electronic device 3 connects to the second connection unit 404 of the network device 4 which is new and unregistered via the second connection module 36.

Take establishing wired connection for example, the user may make both ends of the cable (such as USB cable) respectively connect to the second connection module 36 and the second connection unit 404.

Take wireless connection for example, the user may operate the human-machine interface 38 of the electronic device 3 for inputting a connection operation (such as inputting a set of pairing codes or connection password) to make the second connection module 36 establish a wireless connection with the second connection unit 404 of the network device 4. Furthermore, the second connection module 36 of the electronic device 3 establishes a connection in above-mentioned heterogeneous network with the second connection unit 404 of the network device 4.

Step S202: the processor 30 generates configuration data and sends the generated configuration data to the network device 4 via the connection established in the step S200. More specifically, after establishment of the connection, the user may operate the human-machine interface 38 of the electronic device 3 for inputting a configuration operation (such as inputting connection information of the communication network 5 and/or identity information of the user) for making the processor 30 generate the corresponding configuration data according to the configuration operation.

One of the exemplary embodiments, the configuration data comprises network identity data. For example, the processor 30 may directly take the connection information (such as the SSID and connection password of the communication network 5) of the communication network 5 currently used by the electronic device 3 as above-mentioned network identity data if the first connection unit 402 has been connected to the communication network 5 (take Wi-Fi network for example). In another example, the processor 30 may take the connection information inputted by the user as above-mentioned network identity data.

One of the exemplary embodiments, the configuration data may comprise user identity data. For example, the processor 30 may take the identity information (such as name or codes of a company which the user works, or personal identity number) inputted by the user as above-mentioned user identity data. In another example, the processor 30 may take the identity information used by the user for login as above-mentioned user identity data if the user has logged in the computer program 300 installed in the electronic device 3.

One of the exemplary embodiments, the configuration data may comprise location identity data. For example, the electronic device 3 may comprise a positioning device (not shown in figures, the positioning device may be a GPS locator or an indoor positioning device) electrically connected to the processor 30, the positioning device senses location information (such as a set of latitude and longitude coordinate or a region) of the electronic device 3, the processor 30 may take the sensed location information as above-mentioned location identity data.

Step S204: the process unit 400 of the network device 4 executes configuration according to the received configuration data. One of the exemplary embodiments, the process unit 400 may execute an initial configuration according to the network identity data, the user identity data and/or the location identity data of the configuration data, such as configuring the connection parameters (such as SSID, connection password and/or communication protocol) for communication network 5, configuring an ownership of the network device 4 according to the user identity data, and/or determining the current time according to the location identity data. Step S206: after completion of configuration, the processor 400 may connect to the communication network 5 based on the connection parameters of the communication network 5 via the first connection unit 402, and connect to the control host 2 for communication via the communication network 5.

Step S208: the process unit 400 generates registration data, and sends the generated registration data to the control host 2 via the communication network 5.

One of the exemplary embodiments, the registration data comprises user identity data, device identity data of the network device 4 and location identity data. More specifically, the memory unit 408 of the network device 4 stores the device identity data of the network device 4, such as device ID, MAC address, or Unique ID (UID), and the device identity data is usually unique. The process unit 400 encapsulates the user identity data and the location identity data of the received configuration data and the device identity data stored in the memory unit 408 for generating the registration data.

One of the exemplary embodiments, the network device 4 may comprises a positioning unit (not shown in figures, the positioning unit may be a GPS locator or an indoor positioning device) electrically connected to the process unit 400, the process unit 400 may retrieve the location information corresponding to the location of the network device 4 via the positioning unit, and take the retrieved location information as the location identity data. Alternatively, the process unit 400 may be positioning through the communication network 5 via the first connection unit 402, such as determining the location information which the network device 4 is located according to a location and/or network latency of a router connected to the network device 4.

Step S210: the control host 2 determines classification information according to the received registration data via the analysis module 240. More specifically, the database 22 may store a plurality of key information (the key information may be one or more association field(s) between a plurality of data sheets of the database), the control host 2 search the key information corresponding to the user identify data of the registration data in the database 22 according to the user identify data of the registration data, and make the searched key information as the classification information.

Take the user identify data being the name or the codes of the company which the user works for example, the database 22 may record the name or the codes (key information) of each of a plurality of different companies. The control host 2 is configured to select the name or codes of the company matched with the user identify data (such as the same name or the same codes) as the classification information.

Take the user identify data being the personal identity number of the user for example, the database 22 may record the name or the codes (key information) of each of a plurality of different companies, and record the personal identity numbers of a plurality of employees of each of the companies. The control host 2 is configured to determine the company which the user works according to the user identify data, and configure the name or the codes of the determined company as the classification information.

Step S212: the control host 2 executes registration for the unregistered networked device 4 via the registration module 242 according to the registration data and the determined classification information. More specifically, the control host 2 is configured to make the device identity data (of the registration data) of the unregistered networked device 4 correspond to both the determined classification information and the location identity data of the registration data, and record the corresponding relationship in the database 22 for completion of registration. Furthermore, the control host 2 is configured to associate the device identity data of the registration data with the location identity data of the registration data base on the determined classification information, and record the associated data in the database 22 for completion of registration. Thus, the present disclosed example can execute the registration of the network device 4 automatically.

Step S214: the control host 2 may send a notification of completion of registration to the electronic device 3 via the communication network 5 for notifying the user that the registration of the network device 4 had been completed after the completion of the registration.

One of the exemplary embodiments, the control host 2 may monitor or test the registered networking device 4 via the communication network 5 after the registration had been completed, such as sending a test instruction to the networking device 4 for testing whether the networking device 4 executes the test instruction correctly.

The present disclosed example can effectively omit the manual registration operation of the user via configuring the network device 4 to execute registration to the control host 2 automatically.

Figure 7:
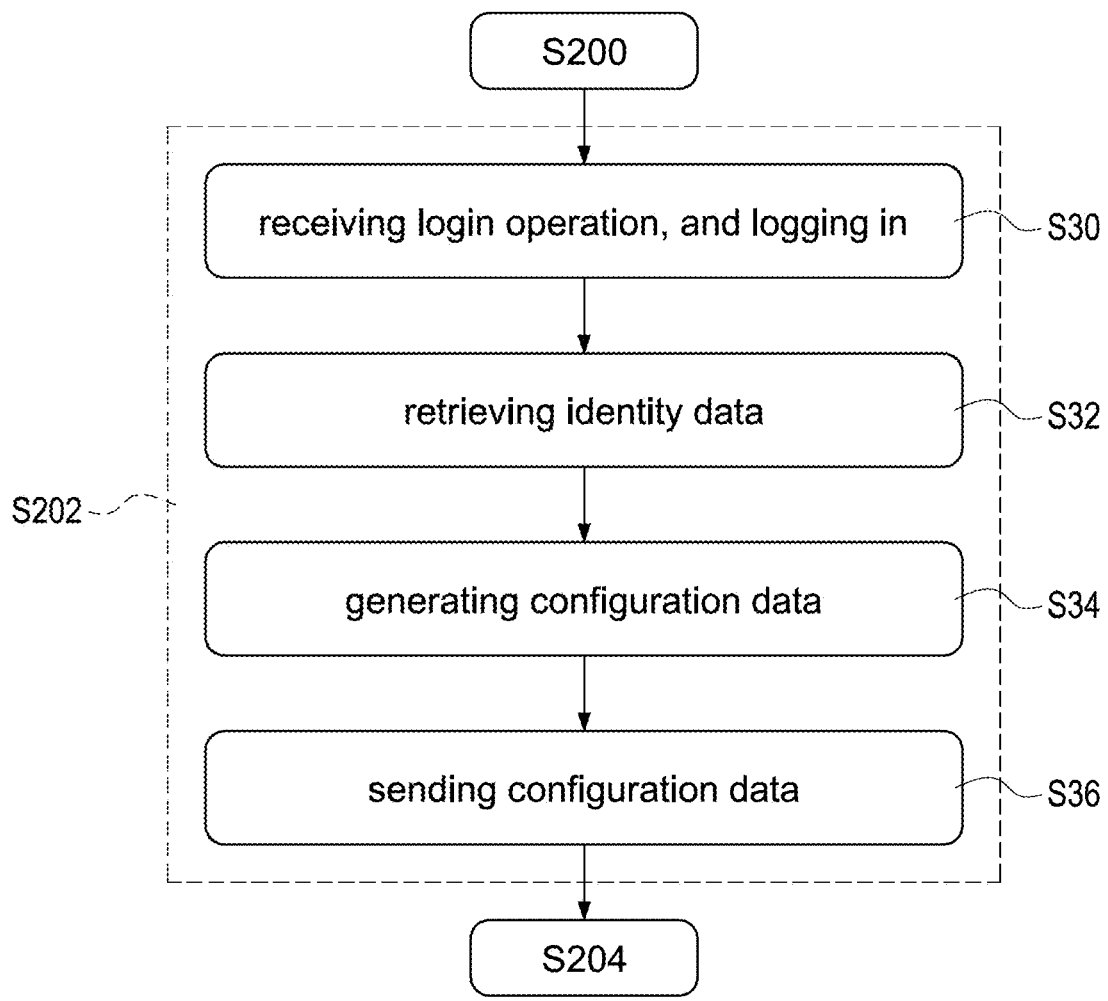
FIG. 7 is a partial flowchart of a method for automatic registration of network device according to a second embodiment of the present disclosed example.

Please refer to FIG. 6 and FIG. 7 simultaneously, FIG. 7 is a partial flowchart of a method for automatic registration of network device according to a second embodiment of the present disclosed example. In this embodiment, the computer program 300 is an application program for monitoring the network management system. Compare to the registration method shown in FIG. 6, the step S202 of the registration method of this embodiment comprises following steps.

Step S30: after execution of the computer program 300, the processor 30 of the electronic device 3 receives a login operation of the user via the human-machine interface 38, generates login information (such as user account and password) according to the login operation, and logs in the user account automatically after the login information is verified.

One of the exemplary embodiments, the processor 30 sends the login information to the control host 2 for verification via the communication network 5, and logs in the user account after receipt a message of passing the verification from the control host 2.

Step: S32 the processor 30 may retrieve network identify data and the user identify data corresponding to the current user account after receiving an operation of adding new network device of the user via the human-machine interface 38.

One of the exemplary embodiments, the processor 30 may search the corresponding user identify data (such as name or codes of the company) in the control host 2 via the communication network 5 according to the user account (such as employee ID or mail address of the employee).

Step S34: the processor 30 generates the configuration data according to the retrieved network identify data and the retrieved user identify data.

One of the exemplary embodiments, the processor 30 may further retrieve the default operation parameters from the memory 32 or the control host 2, and add the operation parameters in the configuration data. Thus, the unregistered networked device can directly operate according to the operation parameters after completion of initialization without manual configuration of the operation parameters by the user.

Step S36: the processor 30 connects to the heterogeneous network via the second connection module 36, and sends the generated configuration data to the unregistered network device 4 connecting to the heterogeneous network.

Thus, the present disclosed example can generate the corresponding configuration data according to the user identity.

One of the exemplary embodiments, a plurality of users may log in the computer program 300 based on the different identities (such as the different user accounts). Moreover, the different identities respectively correspond to the different access levels, each of the user may execute the operation corresponding to the user's access level after login.

Further, the processor 30 first determines whether the current user account has the access of adding a new network device, and executes the steps S32-S36 if the current user account has the access of adding a new network device. Moreover. if the processor 30 determines that the current user account does not have the access of adding a new network device, the processor may output a notification via the human-machine interface 38 or issue an alert to the control host 2. Thus, the present disclosed example can effectively stop the user which does not have access from adding the network device 4.

Figure 8:
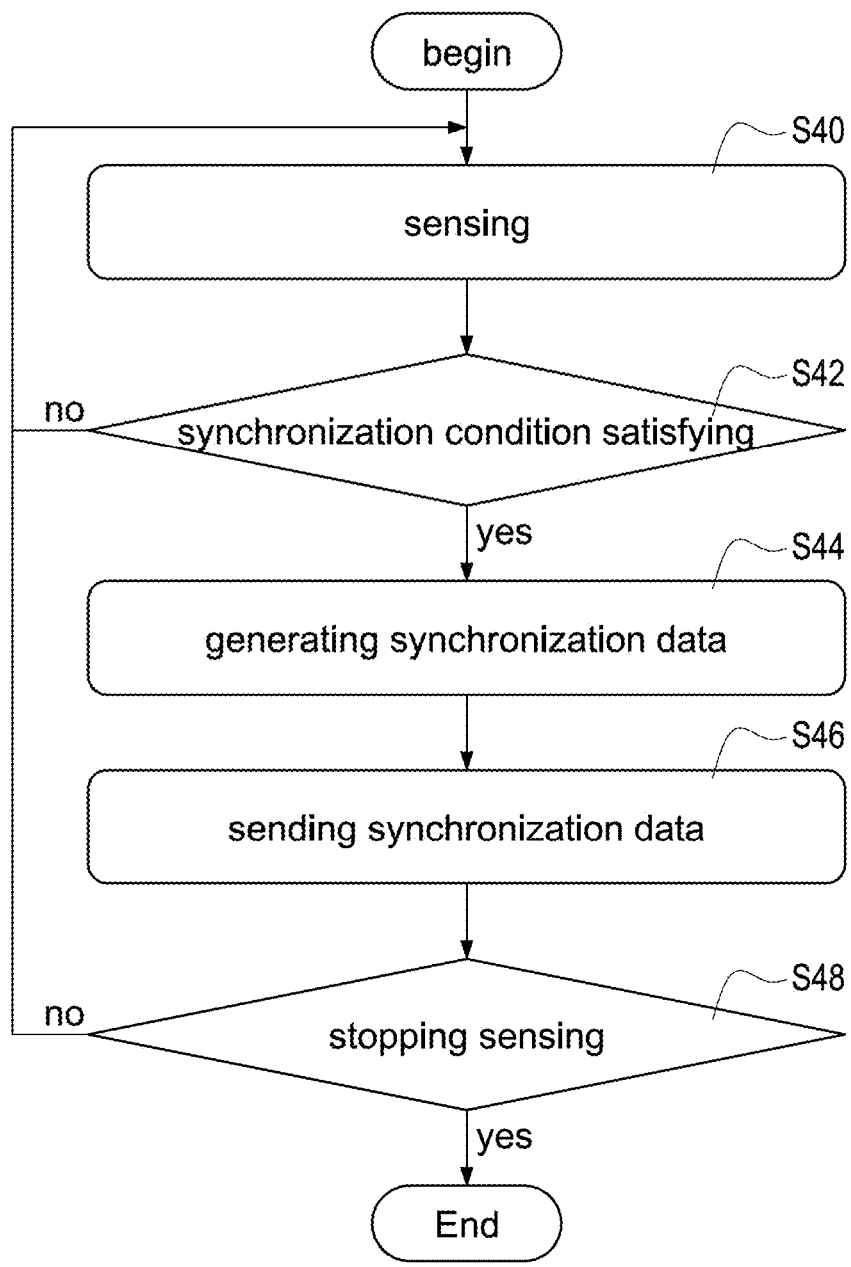
FIG. 8 is a partial flowchart of a method for automatic registration of network device according to a third embodiment of the present disclosed example.

Please refer to FIG. 6 and FIG. 8 simultaneously, FIG. 8 is a partial flowchart of a method for automatic registration of network device according to a third embodiment of the present disclosed example. In this embodiment, the network device 4 has the ability of implementing a sense function (such as environmental-sensing, human detection or network-monitoring), and may sense the sense data continuously after success in registration via the sense unit 406. Moreover, the network device 4 may transmit the (newest) sense data to the control host 2 periodically. Compare to the registration method shown in FIG. 6, the registration method of this embodiment further comprises following steps performed after completion of registration (step S212) for implementing a synchronization function.

Step S40: the process unit 400 of the network device 4 senses a current status (such as an operation status of the function unit 410), an environmental status of the environment which the network device 4 is arranged (such as a status for instructing whether there is any human in the environment, environmental temperature, environmental humidity, or environmental air quality), or a connection status between the network device 4 and the communication network 5 of the network device 4 continuously or intermittently (such as network address, the quality of network, or the latency of network), and generates corresponding sense data after sensing each time.

Step S42: the process unit 400 determines whether any default synchronization condition satisfies. More specifically, the user may configure one or more synchronization condition(s) in advance, and makes them be stored in the memory unit 408. The process unit 400 determines whether any synchronization condition satisfies continuously after the network device 4 is switched on.

The process unit 400 performs step S44 if any synchronization condition satisfies. Otherwise, the process unit 400 performs the step S40 again.

One of the exemplary embodiments, the synchronization condition may be a default time point (such as synchronization at eight a.m. every day), a default time interval (such as synchronization every ten hours), a default event (such as executing synchronization each time the dynamic IP address is changed, executing synchronization if the quantity of sense data stored in the memory unit 408 reaches a default quantity, executing synchronization if the available storage space of the memory unit 408 is less than a default value, or executing synchronization if detecting that any human enters/leaves).

One of the exemplary embodiments, the process unit 400 may determine that the synchronization conditions satisfies and then execute synchronization if determining that a difference between a plurality of continuous sense data is greater than a default value (such as a difference between two continuous sense temperatures is greater than the default value or a maximum difference between ten continuous air qualities greater than the default value).

Compare to directly executing synchronization each time sensing, the present disclosed example can effectively reduce the working hours and working frequency of the first connection unit 402 via executing synchronization after the synchronization condition satisfies, and save electricity consumption.

One of the exemplary embodiments, the process unit 400 may directly execute synchronization after each time sensing.

Step S44: the process unit 400 generates synchronization data according to one or more accumulative sense data. One of the exemplary embodiments, the synchronization data comprises device identity data of the network device 4. The present disclosed example can make the control host 2 correctly recognize the network device 4 corresponding to each of the synchronization data via adding the device identity data of the corresponding network device 4 to the synchronization data.

Step S46: the process unit 400 sends the generated synchronization data to the control host via the first connection unit 402 and the communication network 5.

Furthermore, the control host 2 may record the synchronization data in the database 22 correspondingly (such as first associating the synchronization data with the device identity data, and then recording the association relationship in the database 22) according to the device identity data of the synchronization data after receipt of synchronization data.

Step S48: the process unit 400 determines whether terminate sensing (such as the user disabling the sense function or the network device 4 is shut down).

If the process unit 400 determines to terminate sensing, the process unit 400 terminates the method for automatic registration of network device. Otherwise, the process unit 400 performs the step S40 again.

Figure 9:
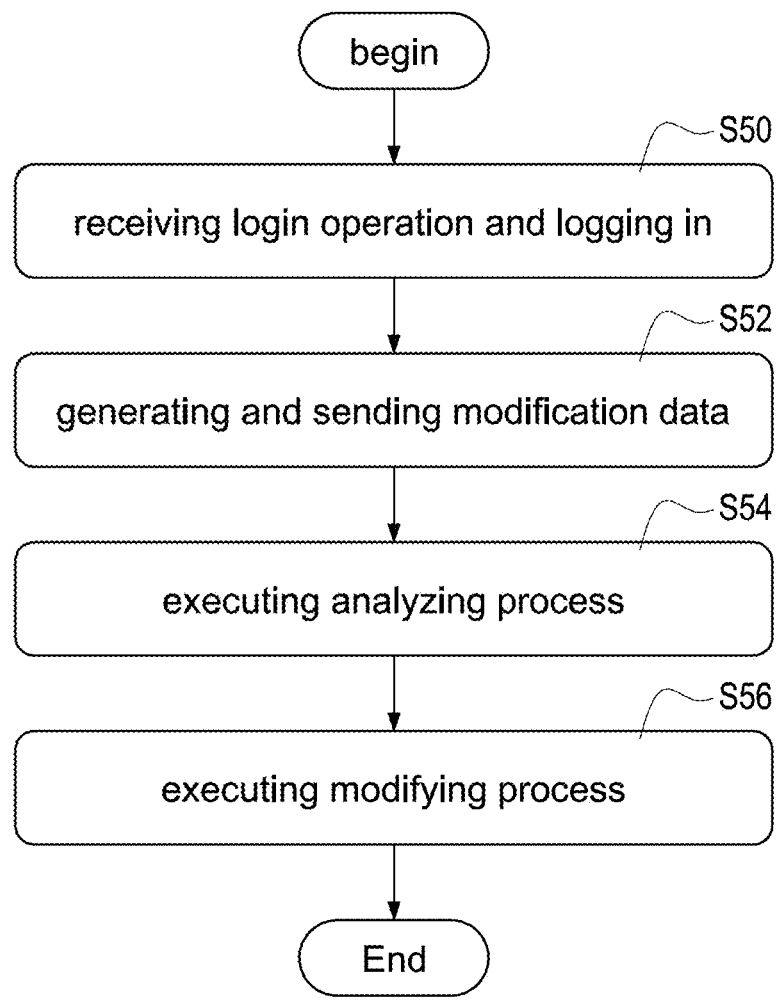
FIG. 9 is a partial flowchart of a method for automatic registration of network device according to a fourth embodiment of the present disclosed example.

Please refer to FIG. 6 and FIG. 9 simultaneously, FIG. 9 is a partial flowchart of a method for automatic registration of network device according to a fourth embodiment of the present disclosed example. In this embodiment, the network management system further provides a function of changing ownership. Via the function of changing ownership, the network management system has the ability of changing an ownership of the network device 4. Compare to the registration method shown in FIG. 6, the registration method of this embodiment further comprises following steps performed after completion of registration (step S212) for implementing the function of changing ownership.

Step S50: the processor 30 of the electronic device 3 receives a login operation from the user via the human-machine interface 38 after execution of the computer program 300, generates login information (such as user account and password) according to the received login operation, and logs in based on the user account automatically after the login information is verified.

Step S52: the processor 30 generates corresponding modification data according to an operation of changing ownership after receipt of the operation of changing ownership from the user via the human-machine interface 38. Then, the processor 30 sends the generated modification data to the control host 2 via the first connection module 34 after generation of the modification data.

One of the exemplary embodiments, above-mentioned modification data may comprise new location identity data. More specifically, the processor 30 may obtain the current location of the electronic device 3 via the positioning device, and configures the obtained location to be the new location identity data. Alternatively, above-mentioned operation of changing ownership may comprise an operation of selecting a new location. The processor 30 generates new location identity data according to the operation of selecting the new location.

One of the exemplary embodiments, above-mentioned operation of changing ownership is configured to select the network device 4 which the user would like to change its owner, and select the new user which is the owner of the owner-changed network device 4. Above-mentioned modification data may comprise the device identity data of the network device 4 which the user would like to modify, and the user identify data of the new user.

One of the exemplary embodiments, the processor 30 first determines whether the current user has an access of modifying ownership (such as administrator access), and accepts the operation of the changing ownership and generates the modification data if the determining that the current user account has the access of modifying ownership. Moreover, the processor 30 may output a notification via human-machine interface 38 or alert to the control host 2 via communication network 5. Thus, the present disclosed example can prevent a user which does not have the access from modifying the ownership of the network device 4 effectively.

One of the exemplary embodiments, the processor 30 sends the generated modification data to the network device 4 which the user would like to change its ownership via the second connection module 36, and the network device 4 forwarding the received modification data via the communication network 5 to the control host 2. Thus, the user may operate the electronic device 3 to change the ownership of the network device 4 even the electronic device 3 does not connect to the communication network 5 directly.

Furthermore, above-mentioned operation of changing ownership may not select the network device 4 which the user would like to change its ownership. In other words, the modification data sent to the network device 4 may not comprise the device identity data. The network device 4 may add its device identity data to the modification data automatically after receipt of the modification data, and forward the modification data had been added the device identity data. The present disclosed example can effectively prevent the user from selecting the incorrect network device 4 and incorrectly modifying the ownership of the incorrect network device 4 via making the network device 4 which the user would like to change its ownership add its device identity data to the modification data automatically and forward the modification data. Besides, the present disclosed example may further prevent the user which does not have the access from modifying the ownership of the network device 4 arbitrarily.

Step S54: the control host 2 determines the new classification information via the analysis module 240 according to the new modification data.

Step: S56: the control host 2 modifies the ownership of the network device 4 which the user would like to change its ownership via the modification module 244 according to the modification data and the determined classification information. More specifically, the control host 2 is configured to replace the classification information corresponding to the device identity data (in other words, the device identity data of the modification data) of the network device 4 with the new classification information, and replace the corresponding location identity data with the new location identity data for completing the modification of ownership. Thus, the present disclosed example may modify the ownership and the arranged location of the registered network device 4 effectively.

Figure 10:
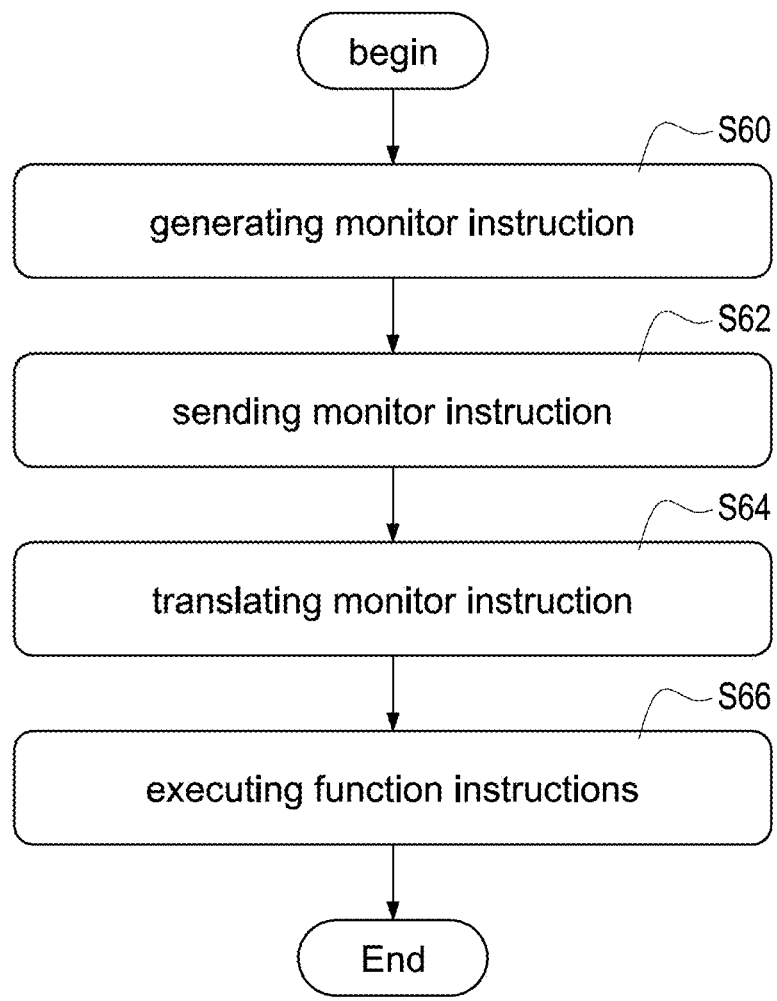
FIG. 10 is a partial flowchart of a method for automatic registration of network device according to a fifth embodiment of the present disclosed example.

Please refer to FIG. 6 and FIG. 10 simultaneously, FIG. 10 is a partial flowchart of a method for automatic registration of network device according to a fifth embodiment of the present disclosed example. In this embodiment, the network management system further provides a function of monitoring network device. Via the function of monitoring network device, the network management system has the ability of monitoring or controlling the network device 4. Compare to the registration method shown in FIG. 6, the registration method of this embodiment further comprises following steps performed after completion of registration (step S212) for implementing the function of monitoring network device.

Step S60: the processor 30 of the electronic device 3 may generate corresponding monitor instruction according to the monitor operation after receipt of the monitor operation from the user via the human-machine interface, wherein above monitor operation is used to instruct the control host 2 to execute the specific function (such as returning the statuses of all the network devices 4).

One of the exemplary embodiments, the processor 30 of the electronic device 3 is configured to connect to the service server 4 of the control host 2 via the first connection module 34. The service server generates and returns monitor dashboard data to the electronic device 3 via the output control module 248. The processor 30 of the electronic device renders the graphical user interface (GUI) according to the received monitor dashboard data, displays the rendered GUI via the human-machine interface 38, and receives above-mentioned monitor operation via the GUI.

Step S62: the processor 30 sends the generated monitor instruction to the control host 2 via the first connection module 34.

One of the exemplary embodiments, the monitor instruction is the API instruction, the processor 30 sends the monitor instruction to the interface server 20 of the control host 2 via the first connection module 34 and the communication network 5.

Step S64: the interface server 20 translates the received monitor instruction for obtained a plurality of function instructions used to implement the monitor function via the translation module 200. Then, the interface server 20 sends a plurality of the obtained function instructions to the service server 24.

Step S66: the service server 24 executes a plurality of the function instructions for implementing the corresponding monitor function in order.

Take the monitor instruct being used to search the network device 4 consistent with a specific condition (such as its ownership is for a specific user) for example. The service server 24 executes the function instructions in order to search in the database 22 for obtaining the corresponding result, and generates output data according to the search result via the output control module 248. Finally, the control host 2 returns the generated output data to the electronic device 3 via the communication network 5 for displaying.

Thus, the present disclosed example can monitor the network device 4 effectively.

Figure 11:
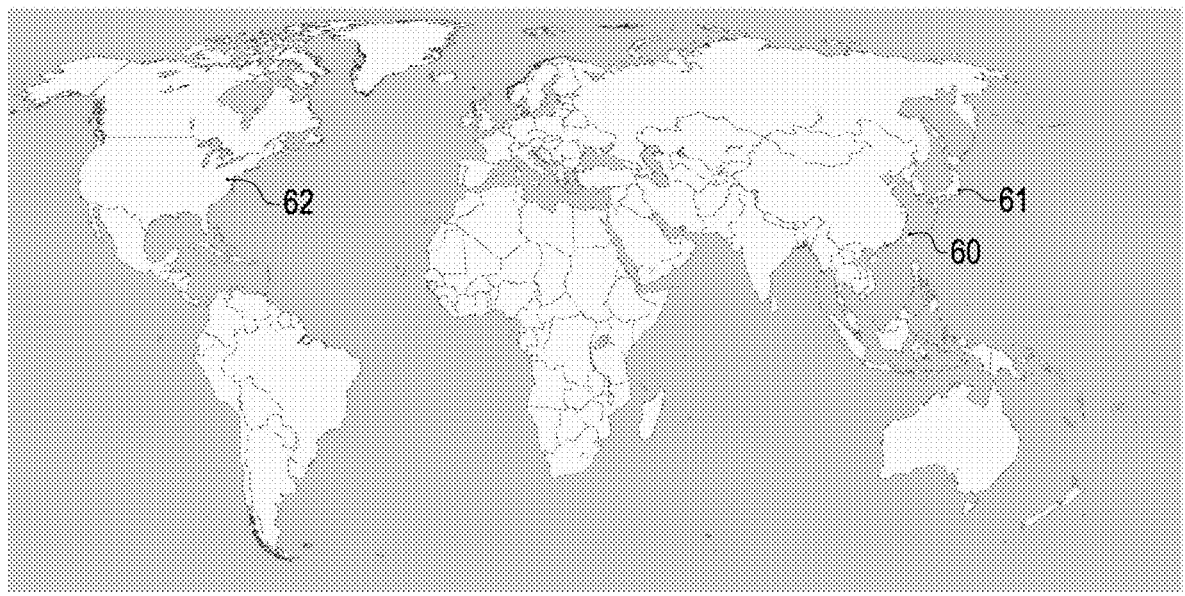
FIG. 11 is a schematic view of a monitor screen according to one embodiment of the present disclosed example.

Please refer to FIG. 11, which is a schematic view of a monitor screen according to one embodiment of the present disclosed example. In this example, the monitor instruction is used to search the network devices 4 that ownership is "Company1".

In this example, the interface server 20 translates the monitor instruction into the function instructions. The service server 24 executes the function instructions in order to search in the database 22 according to the search condition (the network device which its ownership is "Company1") for obtaining three records (network device "Device1", network device "Device2", and network device "Device3"), and further retrieves the location identity data (taking "Taipei", "Tokyo" and "New York" for example) of each of three network devices.

Then, the service server 24 marks the arrangement locations 60-62 of each of the network devices "Device1", "Device2" and "Device3" on a map according to the location identity data of each of the network devices "Device1", "Device2" and "Device3", and draws a table for showing the three records.

Finally, the service server 24 makes the marked map and the table as the output data, and transfer them to the electronic device 3 for displaying.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A network management system, comprising:
    a computer program installed in an electronic device being configured to control the electronic device to retrieve connection information of a communication network when the electronic device has connected to the communication network, generate configuration data and transmitting the configuration data, wherein the configuration data comprises network identity data and user identity data, the network identity comprises the connection information;
    a network device being responsive to the electronic device transmitting the configuration data and configured to generate registration data according to the configuration data, connecting to the communication network according to the connection information, and transmitting the registration data via the communication network, wherein the registration data comprises the user identity data, device identity data of the network device and location identity data of the network device;
    a control host connected to the communication network and a database, the control host being configured to search in the database according to the user identity data of the registration data being received, and determine one of a plurality of key information as classification information, each of the plurality of the key information being value of an association field between a plurality of data sheets of the database, the control host being configured to execute a registering process on the device identity data of the registration data being received for associating the device identity data with the location identity data based on the classification information be determined, recording the associated device identity data and the associated location identity data in the data sheets of the database for completing a registration of the network device, and sending a notification to the electronic device of the registration.

2. The network management system according to claim 1, wherein the network device comprises:
    a first connection unit configured to connect to the communication network; and
    a second connection unit configured to connect a heterogeneous network;
    wherein a communication standard of the communication network is incompatible with a communication standard of the heterogeneous network;
    wherein the computer program is configured to log in the electronic device based on a user account, control the electronic device to retrieve the network identity data and the user identity data corresponding to the user account, generate the configuration data according to the network identity data and the user identity data, and transmit the configuration data to the network device via the heterogeneous network.

3. The network management system according to claim 1, wherein the network device comprises a first connection unit, the first connection unit is configured to connect to the communication network and a heterogeneous network;
    wherein a network type of the communication network is the same as a network type of the heterogeneous network;
    wherein the computer program is configured to log in the electronic device based on a user account, control the electronic device to retrieve the network identity data and the user identity data corresponding to the user account, generate the configuration data according to the network identity data and the user identity data, and transmit the configuration data to the network device via the heterogeneous network.

4. The network management system according to claim 1, wherein the control host comprises an analysis module, the analysis module is configured to search in the database according to the user identity data, determine one of the plurality of key information and configure the key information as the classification information.

5. The network management system according to claim 4, wherein the control host further comprises a registration module, the registration module is configured to execute the registering process on the device identity data for associating the device identity data with the location identity data based on the classification information, and record the associated device identity data and the associated location identity data in the data sheets for completing the registration of the network device.

6. The network management system according to claim 1, wherein the network device comprises:
    a memory unit configured to store a synchronization condition;
    a sense unit configured to generate sense data after sensing each time, and store the sense data in the memory unit;
    a first connection unit configured to connect to the communication network and transmit synchronization data to the control host via the communication network;

a process unit electrically connected to the memory unit, the sense unit and the first connection unit, the process unit being configured to generate the synchronization data according to the device identity data and the plurality of the sense data stored in the memory unit if the synchronization data is satisfied;

wherein the control host configures the synchronization data to correspond to the device identity data, and stores the configured synchronization data in the database.

7. The network management system according to claim 1, wherein the computer program is configured to control the electronic device to generate modification data according to a modification operation after logging in the electronic device based on a user account, and transmit the modification data, wherein the modification data comprises the new user identity data, the device identity data of the network device and the new location identity data of the network device;

wherein the control host further comprises an analysis module and a modification module, the analysis module is configured to determine another classification information according to the new user identity data, the modification module is configured to modify the corresponding relationship for configuring the device identity data to correspond to another classification information and the new location identity data.

8. The network management system according to claim 1, wherein the computer program is configured to control the electronic device to generate a monitor instruction according to a monitor operation, and transmit the monitor instruction to the control host via the communication network;

wherein the control host further comprises a monitor module, the monitor module executes the monitor instruction for implementing a monitor function.

9. The network management system according to claim 8, wherein the monitor module searches in the database according to the monitor instruction for obtaining a search result, generates an output data according to the search result, and returns the output data to the electronic device.

10. The network management system according to claim 9, wherein the control host further comprises a service server, the computer program is configured to control the electronic device to connect to the service server for retrieving monitor dashboard data, render a graphical user interface according to the monitor dashboard data, and receive the monitor operation via the graphical user interface.

11. The network management system according to claim 9, wherein the control host further comprises an interface server, the monitor instruction is an API instruction, the interface server translating the monitor instruction for obtaining a plurality of function instructions of a library used to implement the monitor function after reception of the monitor instruction; the monitor module executes the function instructions in order for searching the database, generating the output data and returning the output data.

12. A method for automatic registration of network device applied to a network management system, the network management system comprising a network device, a control host and a computer program used to be installed in an electronic device, the method comprising following steps of:

a) retrieving, by the electronic device, connection information of a communication network when the electronic device has connected to the communication network;

b) generating, by the electronic device, configuration data and transmitting the configuration data to the network device via the computer program, wherein the configuration data comprises network identity data and user identity data, the network identity comprises the connection information;

c) generating, by the network device and responsive to the electronic device transmitting the configuration data, registration data according to the configuration data at the network device, wherein the registration data comprises the user identity data, device identity data of the network device, and location identity data of the network device;

d) connecting, by the network device, to the communication network according to the network identity data, and transmitting the registration data to the control host via the communication network;

e) searching, by the control host, in a database according to the user identity data of the registration data being received to determine one of a plurality of key information as classification information at the control host, wherein each of the plurality of the key information is value of an association field between a plurality of data sheets of the database; and f) executing, by the control host, a registering process on the device identity data of the registration data being received for associating the device identity data with the location identity data based on the classification information be determined, and recording the associated device identity data and the associated location identity data in the data sheets of the database for completing a registration of the network device, and sending a notification to the electronic device of the registration.

13. The method for automatic registration of network device according to claim 12, wherein the step a) comprises following steps of:

a1) logging in the electronic device based on a user account;

a2) retrieving the network identity data and the user identity data corresponding to the user account;

a3) generating the configuration data according to the network identity data and the user identity data, and a4) transmitting the configuration data to the network device via a heterogeneous network.

14. The method for automatic registration of network device according to claim 12, further comprising following steps of:

g1) generating sense data after sensing each time;

g2) generating a synchronization data if a synchronization condition satisfies, wherein the synchronization data comprises the device identity data of the network device; and g3) sending the synchronization data to the control host via the communication network for making the control host configure the synchronization data correspond to the device identity data and record the corresponded synchronization data in a database.

15. The method for automatic registration of network device according to claim 12, further comprising following steps of:

h1) logging in the electronic device based on a user account;

h2) generating modification data according to a modification operation, and transmitting the modification data to the network device for making the network device forward the modification data to the control host, wherein the modification data comprises the new user identity data, the device identity data of the network device and the new location identity data of the network device;

h3) determining another classification information according to the new user identity data at the control host; and h4) modifying the corresponding relationship for configuring the device identity data to correspond to another classification information and the new location identity data.

16. The method for automatic registration of network device according to claim 12, the control host comprises a database, the method further comprises following steps of:

i1) generating a monitor instruction according to a monitor operation at the electronic device;

i2) transmitting the monitor instruction to the control host; and i3) executing the monitor instruction at the control host to search in the database according to the monitor instruction to obtain a search result, generate an output data according to the search result, and return the output data whereby a monitor function is implemented.

17. The method for automatic registration of network device according to claim 16, wherein the control host further comprises a service server, the step i1) is configured to control the electronic device to connect to the service server for retrieving monitor dashboard data, render a graphical user interface according to the monitor dashboard data, and receive the monitor operation via the graphical user interface.

18. The method for automatic registration of network device according to claim 16, wherein the control host further comprises an interface server, the monitor instruction is an API instruction, the step i2) is configured to send the monitor instruction to the interface server;

wherein the step i3) comprises following steps of:

i31) translating the monitor instruction for obtaining a plurality of function instructions of a library used to implement the monitor function after reception of the monitor instruction at the interface server; and i32) executing the function instructions in order for searching the database, generating the output data, and returning the output data.

* * * * *